United States Patent

Alexander

[11] Patent Number: 6,068,204
[45] Date of Patent: May 30, 2000

[54] HOSE END DISPENSER

[76] Inventor: Marcus Alexander, 52 Avebury, Cippenham, Slough, Berkshire SL1 5SY, United Kingdom

[21] Appl. No.: 09/262,196

[22] Filed: Mar. 4, 1999

[51] Int. Cl.[7] .............................. A62C 5/02; B05B 15/06
[52] U.S. Cl. .......................................... 239/310; 239/273
[58] Field of Search ..................................... 239/310, 273

[56] References Cited

U.S. PATENT DOCUMENTS 3,367,353  2/1968  Hunter .................................... 239/310
5,836,518  11/1998  Jester .................................... 239/310

*Primary Examiner*—Andres Kashnikow
*Assistant Examiner*—Davis Hwu

[57] ABSTRACT

A hose end dispenser for selectively spraying water with and without an additive such as liquid fertilizers and insecticides. The hose end dispenser includes a main conduit having opposite proximal and distal ends and a bypass conduit with a pair of opposite ends fluidly connected to the main conduit. A first of the ends of the bypass conduit is positioned adjacent the proximal end of the main conduit. A second of the ends of the bypass conduit is positioned adjacent the distal end of the main conduit. A container is fluidly connected to main conduit between the first and second ends of the bypass conduit. A rotatable dispensing ball is interposed between the container and the main conduit. A bypass valve is positioned adjacent the proximal end of the main conduit and the first end of the bypass conduit for selectively opening and closing passage of fluid through the main conduit and the bypass conduit, the bypass valve.

10 Claims, 3 Drawing Sheets

HOSE END DISPENSER

BACKGROUND OF THE INVENTION

1. Field of the Invention

The present invention relates to hose end dispensers and sprayers and more particularly pertains to a new hose end dispenser for selectively spraying water with and without an additive such as liquid fertilizers and insecticides.

2. Description of the Prior Art

The use of hose end dispensers and sprayers is known in the prior art. More specifically, hose end dispensers and sprayers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,349,157 by Beiswenger et al.; U.S. Pat. No. 4,512,955 by Etani; U.S. Pat. No. 4,039,105 by Chan; U.S. Pat. No. 2,711,928 by Randa; U.S. Pat. No. Des. 281,900 by Gunzel, Jr. et al.; and U.S. Pat. No. 4,583,688 by Crapser.

While these devices fulfill their respective, particular objectives and requirements, the aforementioned patents do not disclose a new hose end dispenser. The inventive device includes a main conduit having opposite proximal and distal ends and a bypass conduit with a pair of opposite ends fluidly connected to the main conduit. A first of the ends of the bypass conduit is positioned adjacent the proximal end of the main conduit. A second of the ends of the bypass conduit is positioned adjacent the distal end of the main conduit. A container is fluidly connected to main conduit between the first and second ends of the bypass conduit. A rotatable dispensing ball is interposed between the container and the main conduit. A bypass valve is positioned adjacent the proximal end of the main conduit and the first end of the bypass conduit for selectively opening and closing passage of fluid through the main conduit and the bypass conduit, the bypass valve.

In these respects, the hose end dispenser according to the present invention substantially departs from the conventional concepts and designs of the prior art, and in so doing provides an apparatus primarily developed for the purpose of selectively spraying water with and without an additive such as liquid fertilizers and insecticides.

SUMMARY OF THE INVENTION

In view of the foregoing disadvantages inherent in the known types of hose end dispensers and sprayers now present in the prior art, the present invention provides a new hose end dispenser construction wherein the same can be utilized for selectively spraying water with and without an additive such as liquid fertilizers and insecticides.

The general purpose of the present invention, which will be described subsequently in greater detail, is to provide a new hose end dispenser apparatus and method which has many of the advantages of the hose end dispensers and sprayers mentioned heretofore and many novel features that result in a new hose end dispenser which is not anticipated, rendered obvious, suggested, or even implied by any of the prior art hose end dispensers and sprayers, either alone or in any combination thereof.

To attain this, the present invention generally comprises a main conduit having opposite proximal and distal ends and a bypass conduit with a pair of opposite ends fluidly connected to the main conduit. A first of the ends of the bypass conduit is positioned adjacent the proximal end of the main conduit. A second of the ends of the bypass conduit is positioned adjacent the distal end of the main conduit. A container is fluidly connected to main conduit between the first and second ends of the bypass conduit. A rotatable dispensing ball is interposed between the container and the main conduit. A bypass valve is positioned adjacent the proximal end of the main conduit and the first end of the bypass conduit for selectively opening and closing passage of fluid through the main conduit and the bypass conduit, the bypass valve.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new hose end dispenser apparatus and method which has many of the advantages of the hose end dispensers and sprayers mentioned heretofore and many novel features that result in a new hose end dispenser which is not anticipated, rendered obvious, suggested, or even implied by any of the prior art hose end dispensers and sprayers, either alone or in any combination thereof.

It is another object of the present invention to provide a new hose end dispenser which may be easily and efficiently manufactured and marketed.

It is a further object of the present invention to provide a new hose end dispenser which is of a durable and reliable construction.

An even further object of the present invention is to provide a new hose end dispenser which is susceptible of a low cost of manufacture with regard to both materials and labor, and which accordingly is then susceptible of low prices of sale to the consuming public, thereby making such hose end dispenser economically available to the buying public.

Still yet another object of the present invention is to provide a new hose end dispenser which provides in the apparatuses and methods of the prior art some of the advantages thereof, while simultaneously overcoming some of the disadvantages normally associated therewith.

Still another object of the present invention is to provide a new hose end dispenser for selectively spraying water with and without an additive such as liquid fertilizers and insecticides.

Yet another object of the present invention is to provide a new hose end dispenser which includes a main conduit having opposite proximal and distal ends and a bypass conduit with a pair of opposite ends fluidly connected to the main conduit. A first of the ends of the bypass conduit is positioned adjacent the proximal end of the main conduit. A second of the ends of the bypass conduit is positioned adjacent the distal end of the main conduit. A container is fluidly connected to main conduit between the first and second ends of the bypass conduit. A rotatable dispensing ball is interposed between the container and the main conduit. A bypass valve is positioned adjacent the proximal end of the main conduit and the first end of the bypass conduit for selectively opening and closing passage of fluid through the main conduit and the bypass conduit, the bypass valve.

Still yet another object of the present invention is to provide a new hose end dispenser that has a detachable container for holding an additive therein that may be removed even while water is flowing through the present invention to refill or replace the additive without having water spray out of the point of the connection of the container.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
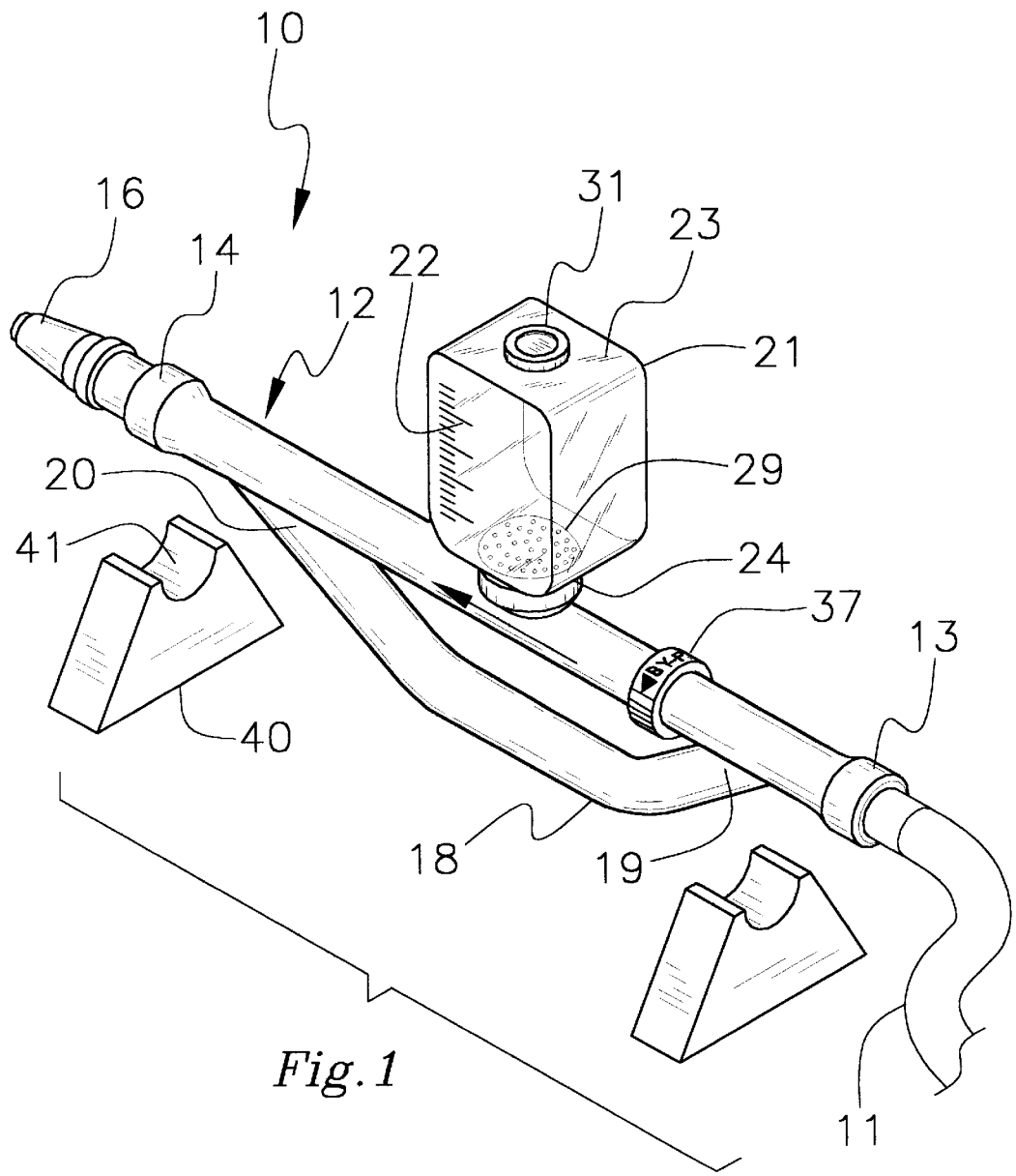
FIG. 1 is a schematic perspective view of a new hose end dispenser according to the present invention.

With reference now to the drawings, and in particular to FIGS. 1 through 7 thereof, a new hose end dispenser embodying the principles and concepts of the present invention and generally designated by the reference numeral 10 will be described.

As best illustrated in FIGS. 1 through 7, the hose end dispenser 10 generally comprises a main conduit having opposite proximal and distal ends and a bypass conduit with a pair of opposite ends fluidly connected to the main conduit. A first of the ends of the bypass conduit is positioned adjacent the proximal end of the main conduit. A second of the ends of the bypass conduit is positioned adjacent the distal end of the main conduit. A container is fluidly connected to main conduit between the first and second ends of the bypass conduit. A rotatable dispensing ball is interposed between the container and the main conduit. A bypass valve is positioned adjacent the proximal end of the main conduit and the first end of the bypass conduit for selectively opening and closing passage of fluid through the main conduit and the bypass conduit, the bypass valve.

In closer detail, the dispenser 10 is designed for attachment to a hose 11 having a pair opposite open ends. A first of the ends of the hose is fluidly connected to a water supply while a second of the ends of the hose has a threaded portion therearound. In closer detail the dispenser comprises an elongate tubular main conduit 12 having opposite proximal and distal ends 13,14, and a longitudinal axis extending between the proximal and distal ends of the main conduit. The main conduit has a length defined between the proximal and distal ends of the main conduit. Ideally, the length of the main conduit is about 12 inches.

The proximal end of the main conduit is fluidly connected to the second end of the hose to permit passage of water from the hose into the main conduit. Preferably, the proximal end of the main conduit has a threaded portion 15 threadably coupled to the threaded portion of the second end of the hose. A spray nozzle 16 is fluidly connected to the distal end of the main conduit to permit spraying of water passing through the main conduit out of the nozzle. Preferably, the distal end of the main conduit has a threaded portion 17 threadably coupled to the nozzle.

A generally U-shaped tubular bypass conduit 18 is downwardly depended from the main conduit. The bypass conduit has a pair of opposite ends fluidly connected to the main conduit. A first of the ends 19 of the bypass conduit is positioned adjacent the proximal end of the main conduit while a second of the ends 20 of the bypass conduit is positioned adjacent the distal end of the main conduit.

Figure 2:
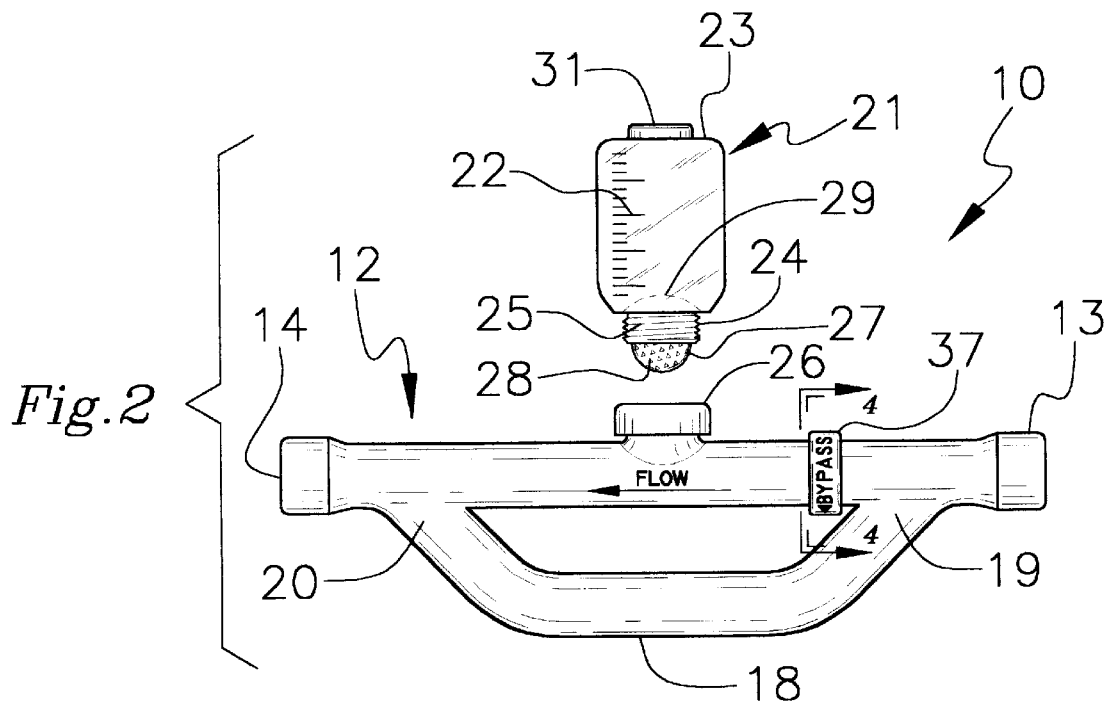
FIG. 2 is a schematic exploded side view of the present invention.

A container 21 is fluidly connected to main conduit between the proximal and distal ends of the main conduit and between the first and second ends of the bypass conduit. In use, the container is designed for holding a fluid additive therein such as fertilizers and insecticides. The container preferably comprises a translucent or transparent material to permit viewing of the contents of the container. As illustrated in FIGS. 1 and 2, the container ideally has calibrated indicia 22 therein for indicating the volume of contents in the container.

The container has opposite top and bottom ends 23,24. The bottom end of the container has a threaded opening 25. The main conduit has a threaded opening 26 between the proximal and distal ends of the main conduit. The threaded opening of the bottom end of the container is threadably coupled to the threaded opening of the main conduit to fluidly connect the container to the main conduit.

The bottom end of the container has a generally spherical dispensing ball 27 rotatably mounted in the threaded opening of the bottom end of the container such that the dispensing ball is interposed between the container and the main conduit. The dispensing ball preferably has a textured surface comprising a plurality of outwardly extending extents 28. In use, the extents of the dispensing ball are designed for rotating the dispensing ball as water flows through the main conduit.

Figure 7:
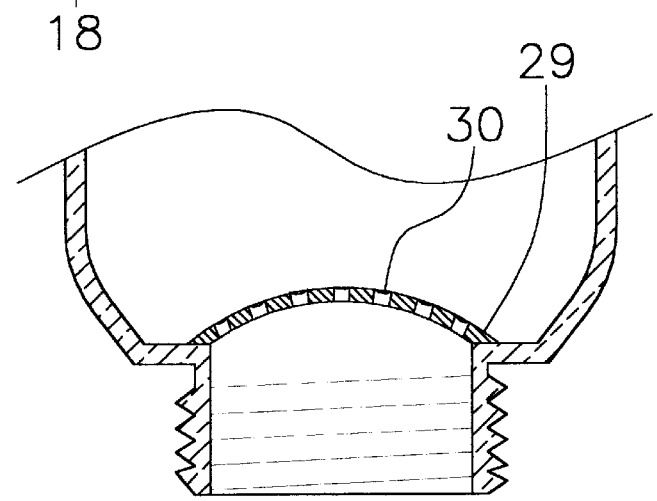
FIG. 7 is a schematic enlarged side view of the filter of the container.

The container ideally has a quasi-semi-permeable filter 29 therein between the dispensing ball and the top end of the container. The filter has a plurality of passages 30 of a predetermined size therethrough to permit passage of fluid additive from the container into the main conduit through the bottom end of the conduit. As best illustrated in FIG. 7, each of the passages of the filter of the container has a generally frusto-conical shape tapering in a direction towards the bottom end of the container so that fluid in the container drips towards the bottom end of the container while hindering passage of fluid upwards through the filter from over spray caused by the rotation of the dispensing ball.

The top end of the container preferably has a refill opening therethrough with a detachable cap 31 substantially closing the refill opening of the container, the refill opening is designed for permitting refilling of the container with a fluid additive.

Figure 4:
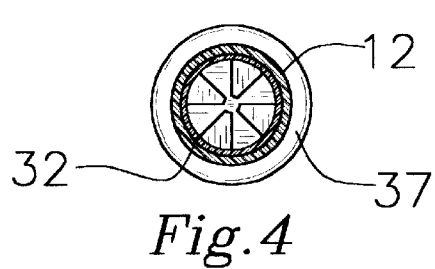
FIG. 4 is a schematic cross sectional view of the iris valve in the closed position taken from line 4—4 of FIG. 3.
Figure 5:
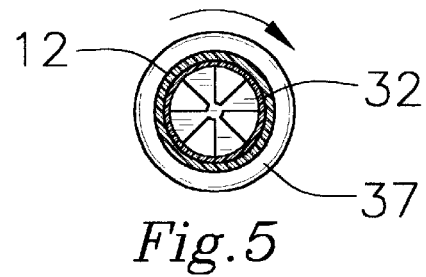
FIG. 5 is a schematic cross sectional view of the iris valve in the open position from the same vantage as FIG. 4.

A bypass valve is positioned adjacent the proximal end of the main conduit and the first end of the bypass conduit for selectively opening and closing passage of fluid through the main conduit and the bypass conduit. The bypass valve comprises an iris valve 32 positioned in the main conduit between the first end of the bypass conduit and the container. With reference to FIGS. 4 and 5, the iris valve is rotatable between has open and closed positions. In use, the iris valve permits passage therethrough of fluid in the main conduit when the iris valve is positioned in the open position (FIG. 5). The iris valve closes passage therethrough of fluid in the main conduit when the iris valve is positioned in the closed position (FIG. 4).

Figure 3:
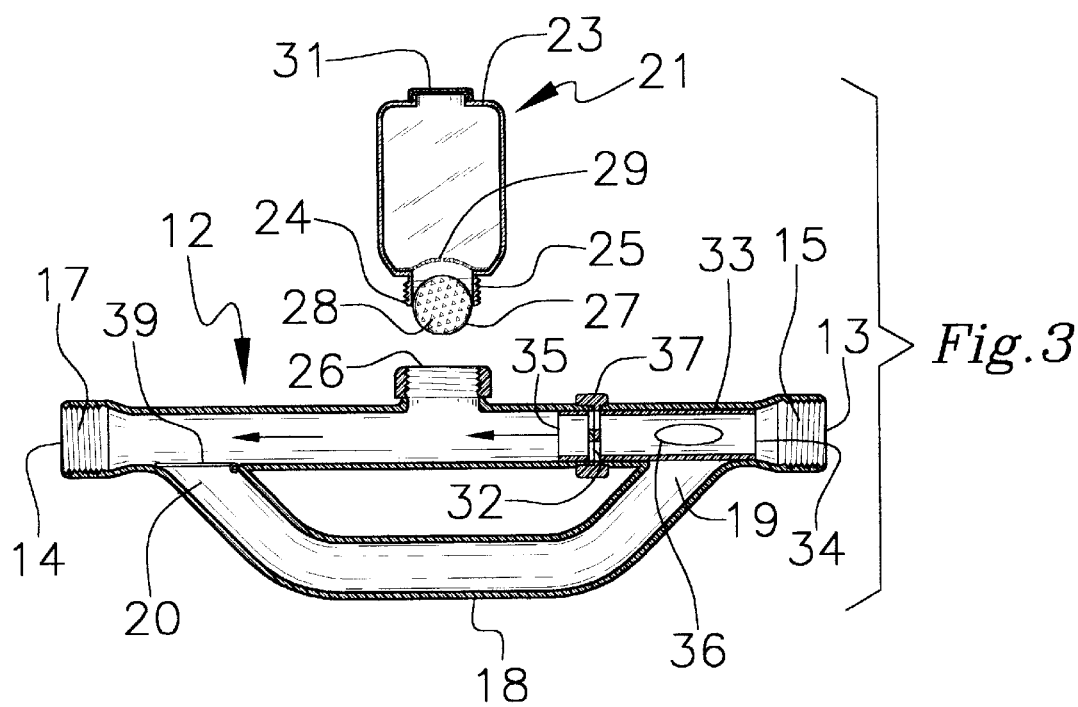
FIG. 3 is a schematic cross sectional view of the present invention with the iris valve in the open position and the inner tube in its first position.
Figure 6:
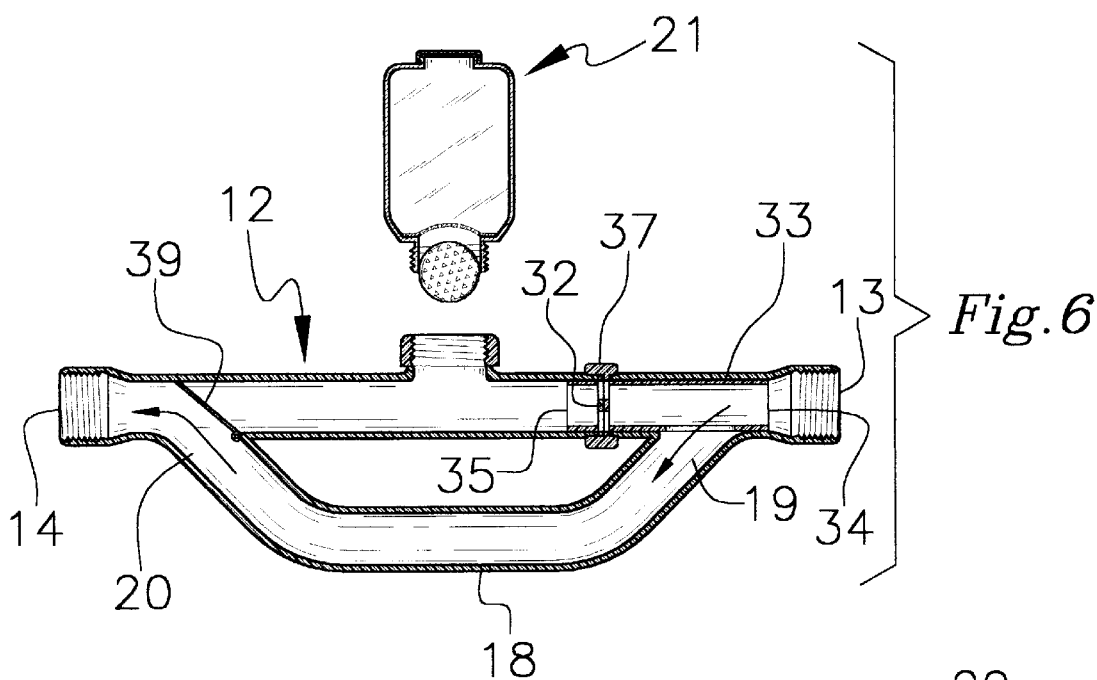
FIG. 6 is a schematic cross sectional view of the present invention with the iris valve in the closed position and the inner tube in its second position.

The bypass valve also comprises an inner tube 33 provided in the main conduit adjacent the proximal end of the main conduit and the first end of the bypass conduit. The inner tube is rotatably mounted in the main conduit to permit rotation of the inner tube about the longitudinal axis of the main conduit. The inner tube has opposite open proximal and distal ends 34,35. The proximal end of the inner tube is positioned adjacent the proximal end of the main conduit with the first end of the bypass conduit positioned between the proximal and distal ends of the inner tube. The iris valve is coupled to the inner tube and positioned in the inner tube between the first end of the bypass conduit and the distal end of the inner tube. The inner tube has a bypass opening 36 positioned between the proximal and distal ends of the inner tube. With reference to FIGS. 3 and 6, in use, the inner tube is rotatable between has first and second positions. The inner tube is positioned in the first position (FIG. 3) when the iris valve is positioned in the open positioned. The inner tube is positioned in the second position (FIG. 6) when the iris valve is positioned in the closed positioned. In use, the inner tube substantially closes passage of fluid from the main conduit into the first end of the bypass conduit when the inner tube is positioned in the first position to permit the fluid to mainly pass through just the main conduit. As illustrated in FIG. 6, the bypass opening of the inner tube is positioned adjacent the first end of the bypass conduit when the inner tube is positioned in the second position to permit passage therethrough of fluid from the main conduit into the first end of the bypass conduit.

The bypass valve also includes an annular turn ring 37 rotatably disposed around the main conduit and connected to the iris valve and the inner tube to permit positioning of the iris valve in the open and closed positioned and positioning of and the inner tube in the first and second positions by rotation of the turn ring about the main conduit. In use, rotation of the turn ring in a first direction about the main conduit positions the iris valve in the open position and the inner tube in the first position while rotation of the turn ring in a second direction opposite the first direction positions the iris valve in the closed position and the inner tube in the second position.

A flap valve 39 substantially closes the second end of the bypass conduit and is pivotally coupled to main conduit. In use, the flap valve is designed for preventing back flow into either the bypass conduit when the main conduit is open (FIG. 3) or the main conduit when the bypass conduit is open (FIG. 6).

Preferably, a pair of generally triangular resting saddles 40 are provided each having a generally semi-circular upper channel 41. The main conduit is rested on the resting saddles in the upper channels of the resting saddles to hold the dispenser when not in use or when replacing the container.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A dispenser for attachment to an end of a hose, comprising:

a main conduit having opposite proximal and distal ends;

a bypass conduit having a pair of opposite ends fluidly connected to said main conduit;

a first of said ends of said bypass conduit being positioned adjacent said proximal end of said main conduit, a second of said ends of said bypass conduit being positioned adjacent said distal end of said main conduit;

a container being fluidly connected to main conduit between said first and second ends of said bypass conduit;

a rotatable dispensing ball being interposed between said container and said main conduit; and a bypass valve for selectively opening and closing passage of fluid through said main conduit and said bypass conduit, said bypass valve being positioned adjacent said proximal end of said main conduit and said first end of said bypass conduit.

2. The dispenser of claim 1, wherein said container has opposite top and bottom ends, said bottom end of said container having a threaded opening, said main conduit having a threaded opening between said proximal and distal ends of said main conduit, said threaded opening of said bottom end of said container being threadably coupled to said threaded opening of said main conduit to fluidly connect said container to said main conduit.

3. The dispenser of claim 1, wherein said dispensing ball having a textured surface comprising a plurality of outwardly extending extents.

4. The dispenser of claim 1, wherein a filter between said dispensing ball and said container, said filter having a plurality of passages of a predetermined size therethrough, each of said passages of said filter having a generally frusto-conical shape tapering in a direction towards said dispensing ball.

5. The dispenser of claim 1, wherein said container has a refill opening and a detachable cap substantially closing said refill opening of said container.

6. The dispenser of claim 1, wherein said bypass valve comprises an iris valve positioned in said main conduit between said first end of said bypass conduit and said container.

7. The dispenser of claim 6, wherein said bypass valve further comprises an inner tube in said main conduit adjacent said proximal end of said main conduit and said first end of said bypass conduit, said inner tube being rotatably mounted in said main conduit, said inner tube having opposite open proximal and distal ends, said proximal end of said inner tube being positioned adjacent said proximal end of said main conduit, said first end of said bypass conduit being positioned between said proximal and distal ends of said inner tube, said inner tube having a bypass opening positioned between said proximal and distal ends of said inner tube.

8. The dispenser of claim 7, wherein said iris valve is positioned in said inner tube between said first end of said bypass conduit and said distal end of said inner tube.

9. The dispenser of claim 7, wherein said bypass valve further comprises an annular turn ring rotatably disposed around said main conduit and connected to said iris valve and said inner tube.

10. A dispenser system, comprising:
- a hose having a pair opposite open ends, a first of said ends of said hose being fluidly connected to a water supply, a second of said ends of said hose having a threaded portion therearound;
- an elongate tubular main conduit having opposite proximal and distal ends, and a longitudinal axis extending between said proximal and distal ends of said main conduit;
- said proximal end of said main conduit being fluidly connected to said second end of said hose to permit passage of water from said hose into said main conduit;
- said proximal end of said main conduit having a threaded portion threadably coupled to said threaded portion of said second end of said hose;
- a nozzle being fluidly connected to said distal end of said main conduit, said distal end of said main conduit having a threaded portion threadably coupled to said nozzle;
- a generally U-shaped tubular bypass conduit being downwardly depended from said main conduit;
- said bypass conduit having a pair of opposite ends fluidly connected to said main conduit;
- a first of said ends of said bypass conduit being positioned adjacent said proximal end of said main conduit, a second of said ends of said bypass conduit being positioned adjacent said distal end of said main conduit;
- a container being fluidly connected to main conduit between said first and second ends of said bypass conduit, said container being adapted for holding a fluid additive therein;
- said container comprising a translucent material;
- said container having calibrated indicia therein;
- said container having opposite top and bottom ends;
- said bottom end of said container having a threaded opening;
- said main conduit having a threaded opening between said proximal and distal ends of said main conduit;
- said threaded opening of said bottom end of said container being threadably coupled to said threaded opening of said main conduit to fluidly connect said container to said main conduit;
- said bottom end of said container having a generally spherical dispensing ball rotatably mounted in said threaded opening of said bottom end of said container such that said dispensing ball is interposed between said container and said main conduit;
- said dispensing ball having a textured surface comprising a plurality of outwardly extending extents;
- said container having a filter therein between said dispensing ball and said top end of said container, said filter having a plurality of passages therethrough;
- each of said passages of said filter of said container having a generally frusto-conical shape tapering in a direction towards said bottom end of said container;
- said top end of said container having a refill opening therethrough, said container having a detachable cap substantially closing said refill opening of said container;
- a bypass valve for selectively opening and closing passage of fluid through said main conduit and said bypass conduit, said bypass valve being positioned adjacent said proximal end of said main conduit and said first end of said bypass conduit;
- said bypass valve comprising an iris valve positioned in said main conduit between said first end of said bypass conduit and said container;
- said iris valve having open and closed positions; said iris valve permitting passage therethrough of fluid in said main conduit when said iris valve is positioned in said open position;
- said iris valve closing passage therethrough of fluid in said main conduit when said iris valve is positioned in said closed position;
- said bypass valve comprising an inner tube in said main conduit adjacent said proximal end of said main conduit and said first end of said bypass conduit;
- said inner tube being rotatably mounted in said main conduit to permit rotation of said inner tube about said longitudinal axis of said main conduit;
- said inner tube having opposite open proximal and distal ends, said proximal end of said inner tube being positioned adjacent said proximal end of said main conduit, said first end of said bypass conduit being positioned between said proximal and distal ends of said inner tube;
- said iris valve being positioned in said inner tube between said first end of said bypass conduit and said distal end of said inner tube;
- said inner tube having a bypass opening positioned between said proximal and distal ends of said inner tube;

said inner tube having first and second positions, said inner tube being positioned in said first position when said iris valve is positioned in said open positioned, said inner tube being positioned in said second position when said iris valve is positioned in said closed positioned;

said inner tube substantially closing said first end of said bypass conduit when said inner tube is positioned in said first position;

said bypass opening of said inner tube being positioned adjacent said first end of said bypass conduit when said inner tube is positioned in said second position to permit passage therethrough of fluid from said main conduit into said first end of said bypass conduit;

said bypass valve comprising an annular turn ring rotatably disposed around said main conduit and connected to said iris valve and said inner tube to permit positioning of said iris valve in said open and closed positioned and positioning of and said inner tube in said first and second positions;

a flap valve substantially closing said second end of said bypass conduit and being pivotally coupled to main conduit; and a pair of generally triangular resting saddles each having a generally semi-circular upper channel, said main conduit being rested on said resting saddles in said upper channels of said resting saddles.

* * * * *